United States Patent
Hara

[19]

[11] Patent Number: 5,276,777
[45] Date of Patent: Jan. 4, 1994

[54] LOCUS CORRECTING METHOD FOR INDUSTRIAL ROBOTS

[75] Inventor: Ryuichi Hara, Oshino, Japan

[73] Assignee: Fanuc Ltd., Minamitsuru, Japan

[21] Appl. No.: 770,789

[22] Filed: Oct. 7, 1991

Related U.S. Application Data

[63] Continuation of Ser. No. 444,149, Nov. 29, 1989, abandoned.

[30] Foreign Application Priority Data

Apr. 27, 1988 [JP] Japan ............... 63-102394

[51] Int. Cl.⁵ .............................. G05B 19/18
[52] U.S. Cl. .......................... 395/87; 395/93
[58] Field of Search ............ 395/87, 86, 93; 219/124.34

[56] References Cited

U.S. PATENT DOCUMENTS

| | | | |
|---|---|---|---|
| 3,920,972 | 11/1975 | Corwin, Jr. et al. | 364/190 |
| 4,448,342 | 5/1984 | Abe et al. | 364/513 |
| 4,590,577 | 3/1986 | Nio et al. | 364/513 |
| 4,594,670 | 6/1986 | Itoh | 364/513 |
| 4,613,943 | 9/1986 | Miyake et al. | 318/568.1 |
| 4,635,206 | 1/1987 | Bhatia et al. | 364/513 |
| 4,639,878 | 1/1987 | Day et al. | 364/513 |
| 4,646,228 | 2/1987 | Ikeda | 364/474.26 |
| 4,670,849 | 6/1987 | Okada et al. | 364/513 |
| 4,689,756 | 8/1987 | Koyama et al. | 364/513 |
| 4,700,118 | 10/1987 | Kishi et al. | 364/513 |
| 4,761,596 | 8/1988 | Nio et al. | 364/513 |
| 4,817,017 | 3/1989 | Kato | 364/513 |
| 4,831,561 | 5/1989 | Utsumi | 364/513 |
| 4,833,381 | 5/1989 | Taft et al. | 219/124.34 |
| 4,835,710 | 5/1989 | Schnelle et al. | 318/574 |
| 4,843,287 | 6/1989 | Taft | 304/513 |
| 4,965,737 | 10/1990 | Iwagaya | 364/474.3 |
| 4,967,125 | 10/1990 | Hara | 395/87 |
| 4,972,347 | 11/1990 | Tarvin et al. | 364/513 |

Primary Examiner—Allen R. MacDonald
Assistant Examiner—George Davis
Attorney, Agent, or Firm—Staas & Halsey

[57] ABSTRACT

The robot is started after a groove line of a workpiece to be welded is taught to the robot as a target movement locus for the distal end of a welding torch, by using a fixed coordinate system. A control unit of the robot calculates a position (Pi) of an individual interpolation point in the fixed coordinate system in accordance with data specified in a program (S5), and successively calculates corrected positions Pi' ($X_i + \Sigma xr'$, $Y_i + \Sigma yr'$, $Z_i + \Sigma zr'$) of respective interpolation points by using a cumulative value of correction amounts (S8). The correction amounts are obtained through transformation of an output of a visual sensor, representing a deviation of a current moving position of the torch from the groove line in a predetermined coordinate system defined by the current position and a current moving direction of the torch end, into a correction amount in the fixed coordinate system. In accordance with the result of a second transformation of the corrected positions Pi, individual axes of the robot are controlled such that the torch end is moved sequentially to the corrected positions (S9), to thereby move the torch end along the target locus. The correction is carried out each time the position of the workpiece is moved.

10 Claims, 4 Drawing Sheets

LOCUS CORRECTING METHOD FOR INDUSTRIAL ROBOTS

This application is a continuation of application Ser. No. 07/444,149, filed Nov. 29, 1989, now abandoned.

BACKGROUND OF THE INVENTION

1. Field of the Invention;

The present invention relates to a locus correcting method for industrial robots.

2. Description of the Related Art

In industrial robots, it is known to preliminarily teach a movement locus (target movement locus) that a work point of a robot should follow during operation by using a fixed coordinate system such as a work coordinate system set for a subject to be processed by the robot or a base coordinate system set for the robot body, and effect playback control of the robot to move the work point of the robot along the target locus. However, during execution of the work, if the position of the subject of work is deviated from the setting position thereof at the time of teaching, the taught locus is also deviated from the target locus. In this case, there occurs a deviation of the actual locus of the work point from the target locus even though the work point is moved exactly along the taught locus, thus making the work inaccurate. Conventionally, when such a deviation occurs, a deviation in the fixed coordinate system is detected and the position of the work point is corrected such that the actual locus coincides with the target locus. However, to detect a deviation in the fixed coordinate system, a sensor system must be constructed so as to cover the entire work region of the robot. Further, when the position of the subject of work is moved frequently during the work, the position of the work point must be corrected each time the subject is moved, whereby the load of information processing of the robot is increased.

SUMMARY OF THE INVENTION

An object of the present invention is to provide a locus correcting method for industrial robots, which can be executed with a simplified sensor system and can reduce the load of information processing of the robot.

To achieve the above object, the present invention provides a locus correcting method for an industrial robot, which comprises the steps of: (a) teaching a target movement locus for a work point of a robot, by using a fixed coordinate system; (b) periodically detecting an error between a current moving position of the work point and the target movement locus, by using a predetermined coordinate system defined by the current moving position and a current moving direction of the work point; (c) converting the error detected in the step (b) and represented by an error vector in predetermined coordinate system into a correction amount by transformation of the error vector into a correction amount in the fixed coordinate system; and (d) correcting the position of the work point by using the correction amount.

As described above, according to the present invention, the position of the work point is corrected in accordance with the correction amount which is obtained through a conversion of an error between the current moving position of the work point periodically detected by using the predetermined coordinate system defined by the current moving position and the current moving direction of the robot work point and the target movement locus taught by using the fixed coordinate system. Accordingly, deviation of the actual movement locus of the work point of the industrial robot from the target movement locus can be easily detected even by a simplified sensor system, and the load of information processing of the robot can be reduced, whereby correction of the movement locus of the robot work point can be carried out easily and immediately.

DESCRIPTION OF THE PREFERRED EMBODIMENT

Figure 1:
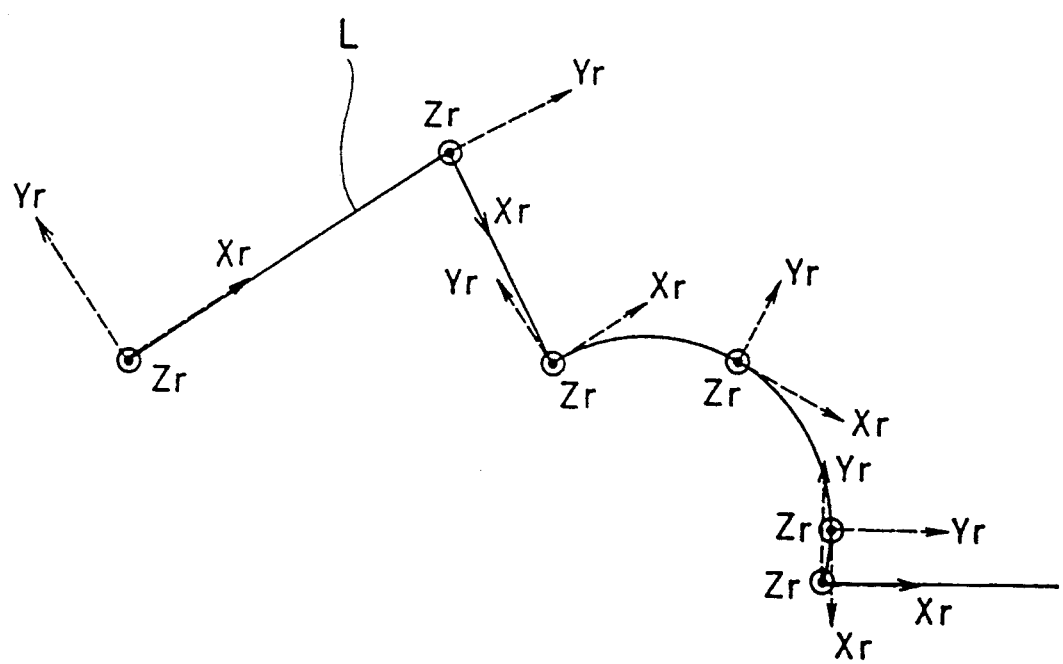
FIG. 1 is a diagram illustrating a predetermined coordinate system used in a locus correcting method according to an embodiment of the present invention.
Figure 2:
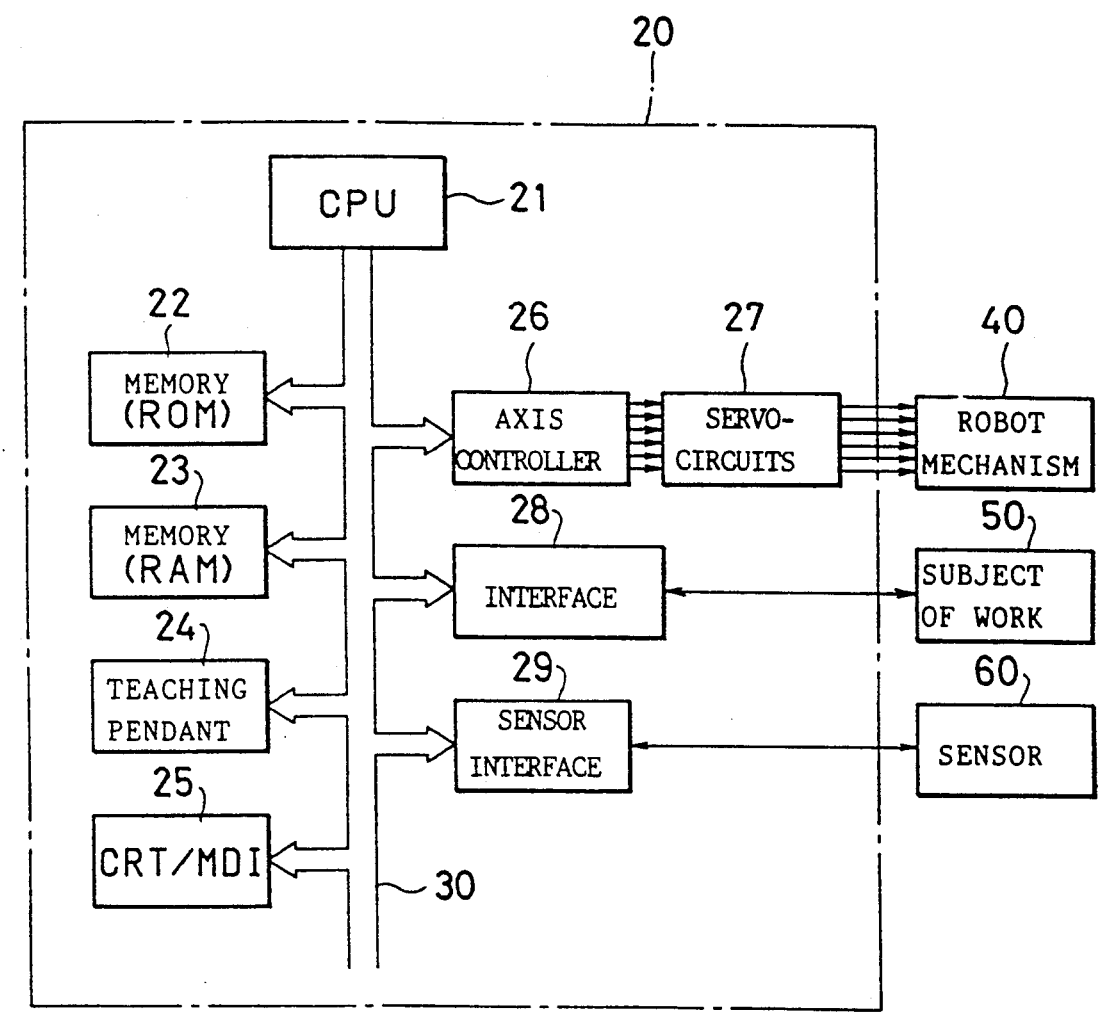
FIG. 2 is a block diagram illustrating a principal part of a robot to which the method according to the embodiment is applied.

In FIG. 2, an industrial robot, having an arrangement basically similar to that of a prior art robot, comprises a control unit 20, a robot mechanism 40 for processing a subject 50 of work under the control of the control unit 20, and a sensor system 60 for detecting operating conditions of various parts of the mechanism 40. The robot mechanism 40 of this embodiment, including a set of arms adjacent ones of which are coupled to each other by a joint whose joint angle is variably controlled by a servomotor, and a welding torch (tool) mounted to a distal end of an arm, for instance, is so arranged as to move the welding torch along a groove line of the workpiece (subject of work) 50, i.e., along a target movement locus of the distal end of the welding torch (the work point of the robot), to carry out arc welding. The sensor system 60 includes a visual sensor (camera) mounted on the distal end of the arm, to detect an error between the distal end of the welding torch and the groove line by means of the camera. Specifically, the camera is arranged such that a field of view thereof covers at least the distal end of the welding torch and part of the groove line close to the torch end, to detect an error between the current moving position of the distal end of the torch and the groove line in a predetermined coordinate system (Xr, Yr, Zr), such as one shown in FIG. 1, which is defined by the current moving position and current moving direction of the distal end of the torch. In FIG. 1, the predetermined coordinate system (Xr, Yr, Zr) is set such that an origin thereof coincides with the current moving position of the distal end of the torch, an Xr axis thereof extends in the current moving direction of the torch end (the direction in which the taught locus extends), a Zr axis thereof extends in a direction perpendicular to the groove line of the workpiece (perpendicular to and upward from (out of) the surface of the drawing of FIG. 1), and a Yr axis thereof extends perpendicular to both the Xr and Zr axes and defined by a right-handed coordinate system.

A central processing unit (hereinafter referred to as CPU) 21 of the control unit 20 is connected through a bus 30 to a memory 22 composed of a ROM, a memory 23 composed of a RAM, a teaching pendant 24, and a manual data input device with a CRT display (hereinafter referred to as CRT/MDI) 25. The memory 22 is stored with various control programs executed by the CPU 21, and the memory 23 is arranged to be stored with a program taught through the teaching pendant 24 and the CRT/MDI 25, and stored with an off-line prepared robot operation program through a tape reader (not shown).

The teaching pendant 24 has a numerical display unit, lamps, operating buttons, etc. that are necessary for the manipulation of the robot. The CRT/MDI 25 has a mode selection key, character/numeral entry keys, cursor keys, and various function keys. Further, the robot is arranged to be supplied with command data through the teaching pendant 24 and the CRT/MDI 25.

The CPU 21 is also connected through the bus 30 to an axis controller 26 including an interpolator, an interface 28 for exchange of signals with a sensor system (not shown) etc. associated with the work subject 50, and a sensor interface 29 connected to the sensor system 60. Servomotors for individual axes of the robot mechanism 40 are arranged to be driven by servo-circuits 27 connected to the axis controller 26.

Figure 3:
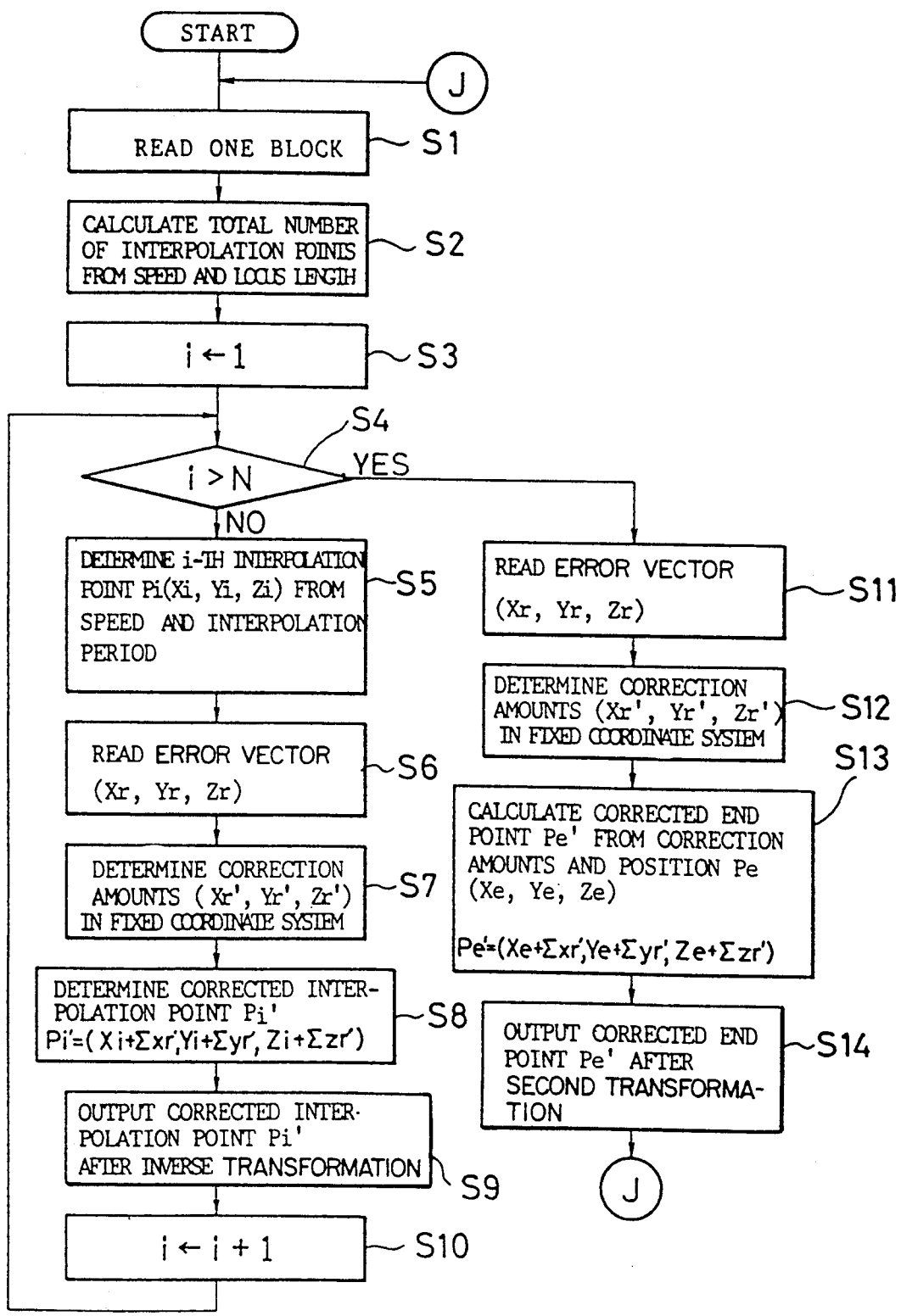
FIG. 3 is a flowchart of a program for locus correction control, executed by the robot of FIG. 2.

Now, a locus correcting method for robots, according to an embodiment of the present invention will be described with reference to FIG. 3.

Before operating the robot, an operator sets a workpiece to be welded, which is a subject of work, in a predetermined positional relation to the body of the robot. Then, the operator operates the teaching pendant 24 and the CRT/MDI 25 to teach the robot a target movement locus (groove line) that the distal end of the torch should follow during the work, by using a fixed coordinate system (X, Y, Z) shown in FIG. 4, e.g., a base coordinate system.

As the operator inputs an operation start command to the robot, the CPU 21 reads out a first block from a teaching program stored in the memory 23 (Step S1), and drives the robot mechanism 40 to bring the distal end of the torch to the start point of the target movement locus (taught locus) represented by the fixed coordinate system (X, Y, Z). The CPU 21 then calculates the length of the movement locus of this block in accordance with the start point (generally, current moving position PO) and a target moving position specified in the block concerned and represented by the fixed coordinate system, to obtain a total number N of interpolation points for this block, by dividing the calculated locus length by a movement speed v specified in the program (Step 2).

After an index i (=1, 2, ..., N) is set to "1" (Step S3), it is determined whether the index i is greater than the total number N of interpolation points (Step S4). Here, since i=1 (<N), the program proceeds to Step S5 in which the position P1 of the first interpolation point (generally, position Pi of the i-th interpolation point) in the fixed coordinate system (X, Y, Z) is calculated on the basis of the commanded movement speed v and an interpolation period T, and in accordance with the following equation (1), $$Pi = Pi-1 + v \cdot T \qquad (1)$$

Next, the CPU 21 reads out through the sensor interface 29 an output (an error vector) of the camera of the sensor system 60. The output represents a deviation (xr, yr, zr) of the current moving position of the torch end (here, the start point PO of the target locus as taught) from the groove line (target locus) in the predetermined coordinate system (Xr, Yr, Zr) (Step S6). The error vector defined in the predetermined coordinate system is transformed into correction amounts (xr', yr', zr') in the fixed coordinate system, by means of a coordinate system transformation process conventionally known (Step S7), and these correction amounts are added to cumulative correction amounts previously accumulated, to obtain new cumulative correction amounts ($\Sigma xr'$, $\Sigma yr'$, $\Sigma zr'$). Then, in accordance with equation (2) given below, the new cumulative correction amounts (which are initially equal to xr', yr', zr', respectively) are added to the i-th interpolation point initially, position P1 of the first interpolation point obtained in Step S5 from the start point P0), thereby calculating a corrected position Pi' of the i-th interpolation point (initially, corrected position P1' of the first interpolation point) in the fixed coordinate system (Step S8).

$$Pi' = (Xi + \Sigma xr', Yi + \Sigma yr', Zi + \Sigma zr') \qquad (2)$$

The CPU 21 then carries out an a second transformation (inverse conversion) on the corrected position, i.e., P1' of the first interpolation point, to calculate angles of rotation of individual axes of the robot mechanism 40 that bring about the corrected position Pi' (initially P1') and drives the servomotors of individual axes through the axis controller 26 and the servo-circuits 27 so that the distal end of the torch is moved to the corrected position Pi' (initially P1') while the orientation of the torch is held in a predetermined relation relative to the workpiece 50 (Step S9). Then, the index i is incremented (Step S10), and the aforementioned process beginning from Step S4 is repeated until the index i becomes greater than the total number N of interpolation points.

Figure 4:
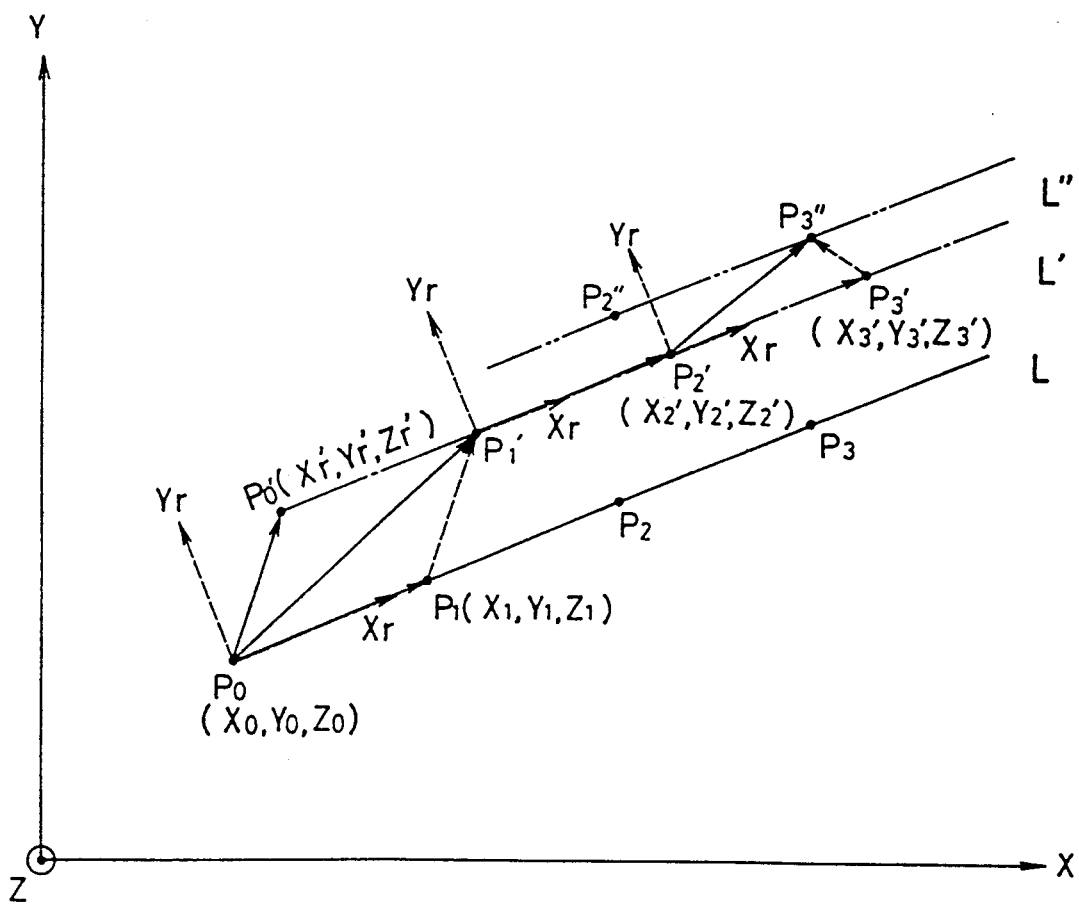
FIG. 4 is a diagram illustrating a locus correction effected by the robot of FIG. 2.

Now, the above locus correcting method will be described in more detail with reference to FIG. 4.

Here, let it be assumed that the distal end of the torch assumes the position P0 (X0, Y0, Z0) in the fixed coordinate system and the target movement locus of the torch end (groove line) is shifted from a taught locus L to a locus L' due to shifting of the position of the workpiece from the setting position at the time of teaching. In this case, as described above, the camera of the sensor system 60 outputs an error vector (xr, yr, zr) representing an amount of the above locus shift in the predetermined coordinate system (Xr, Yr, Zr) whose origin corresponds to the current moving position of the torch end and which is determined by the current moving direction of the torch end (taught locus L) and the positional relationship between the torch and the workpiece. The CPU 21 positions the distal end of the torch at the corrected position P1' of the first interpolation point which is equivalent to the sum of the taught position P1 of the first interpolation point and the correction amounts (xr', yr', zr'), as mentioned above. Thus, if the taught locus L is deviated from the target locus L', it is immediately corrected within one period of the correction process by the CPU 21. If the workpiece remains unmoved by the time the distal end of the torch reaches the corrected position P1', correction data (0, 0, 0) is output, and accordingly, the distal end of the torch is moved to the next target position P2' calculated in accordance with the aforesaid equations (1) and (2), without carrying out the locus correction. If the workpiece is moved again during movement of the torch end and accordingly the taught locus is shifted to a target locus L'', a position P3'' on the locus L'' is set as the next target position by using the cumulative correction amounts obtained from the previous two movements of the workpiece, when the target position P2' is reached, whereby the movement of the workpiece is compensated for by the locus correction. The example shown in FIG. 4 does not include rotation of the workpiece, but in the case of a workpiece movement involving rotation, a conventionally known coordinate system transformation including rotation is executed when the correction data (error vector) in the predetermined coordinate system is transformed into the correction amounts in to the fixed coordinate system.

Referring again to FIG. 3, the locus correcting process will be described further.

If the result of the determination in Step S4 is affirmative (i>N), that is, when the movement control of the torch end is finished for all the interpolation points, the CPU 21 calculates correction amounts (xr', yr', zr') represented by the fixed coordinate system, in accordance with the correction data (xr, yr, zr) read from the sensor system 60 (Steps S11 and S12). Then, new cumulative correction amounts (Σxr', Σyr', Σzr'), obtained by adding these correction amounts to the cumulative correction amounts accumulated by then, are added to the position Pe (Xe, Ye, Ze) of the end point of the block read in Step S1, to obtain a corrected position Pe' (Xe+Σxr', Ye+Σyr', Ze+Σzr') of the end point (Step S13). Subsequently, the CPU 21 drives the servomotors of individual axes such that the distal end of the torch is moved to a corrected position Pe' after a second transformation of the corrected position Pe' of the end point into the robot coordinate system to determine angles of rotation of the robot axes (Step S14). Then, the flow returns to Step S1 to read out the next block, and the aforementioned process is executed for this block.

Although the above embodiment is explained by referring to an arc welding robot, the present invention is not limited to this application alone.

What is claimed is:

1. A locus correcting method for an industrial robot, comprising the steps of:
   (a) teaching a target movement locus for a work point of a robot, using a fixed coordinate system;
   (b) periodically detecting an error between a current moving position of the work point and the target movement locus, using a predetermined coordinate system defined by the current moving position and a current moving direction of the work point to define an error vector;
   (c) transforming the error vector defined in the predetermined coordinate system into a correction amount in reference to the fixed coordinate system; and
   (d) correcting the current moving position of the work point using the correction amount.

2. The locus correcting method according to claim 1, wherein the predetermined coordinate system has an origin coinciding with the current moving position of the work point, a first coordinate axis extending in the current moving direction of the work point, a second coordinate axis extending in a direction perpendicular to the target movement locus taught in step (a), and a third coordinate axis perpendicular to the first and second coordinate axes.

3. The locus correcting method according to claim 2, wherein detection of the error in said step (b) is carried out using a sensor having a field of view covering at least the current moving position of the work point and part of the target movement locus.

4. The locus correcting method according to claim 1, wherein said correcting in said step (d) comprises the steps of:
   (d1) performing an inverse conversion on a corrected position of the work point to determine operating conditions of individual axes of the robot for achieving the corrected position; and
   (d2) driving movement of the robot along the individual axes in dependence upon the operating conditions determined in step (d1).

5. The locus correcting method according to claim 4, wherein detection of the error in said step (b) is carried out using a sensor having a field of view covering at least the current moving position of the work point and part of the target movement locus.

6. The locus correcting method according to claim 1, wherein detection of the error in said step (b) is carried out using a sensor having a field of view covering at least the current moving position of the work point and part of the target movement locus.

7. An apparatus for correcting an actual movement locus of a robot relative to a workpiece, the robot having a fixed coordinate system, said apparatus comprising:
   locus definition means for defining a target movement locus of a work point of the robot relative to the workpiece;
   a sensor system to periodically generate an error vector, representing an error between a current moving position of the work point and the target movement locus, in a work point coordinate system defined by the current moving position and a current moving direction of the work point;
   a processing unit, operatively connected to said locus definition means and said sensor system, to transform the error vector in the work point coordinate system into a correction amount in reference to the fixed coordinate system of the robot; and
   an axis controller, operatively connected to said processing unit, to control movement of the work point of the robot in dependence upon the target movement locus and the correction amount.

8. An apparatus as recited in claim 7, wherein said locus definition means comprises:
   a teaching pendent for producing signals indicating the target movement locus of the work point when the workpiece is in a predetermined orientation in the fixed coordinate system; and
   a memory, operatively connected to said processing unit and said teaching pendant, for storing robot control data indicating the target movement locus in dependence upon the signals produced by said teaching pendant.

9. An apparatus as recited in claim 7, wherein said locus definition means comprises a memory, operatively connected to said processing unit, for storing robot control data indicating the target movement locus.

10. An apparatus as recited in claim 7, wherein the robot has an arm, and
    wherein said sensor system comprises a television camera mounted on the arm of the robot.

* * * * *

UNITED STATES PATENT AND TRADEMARK OFFICE
CERTIFICATE OF CORRECTION

PATENT NO. : 5,276,777
DATED : January 4, 1994
INVENTOR(S) : Ryuichi Hara

It is certified that error appears in the above-indentified patent and that said Letters Patent is hereby corrected as shown below:

Col. 4, line 11, "initially," should be --(initially,--.

Col. 5, line 65, "claim 2," should be --claim 1,--.

Signed and Sealed this

Sixth Day of September, 1994

Attest:

BRUCE LEHMAN

*Attesting Officer*   *Commissioner of Patents and Trademarks*